United States Patent [19]
Lee et al.

[11] Patent Number: 5,448,509
[45] Date of Patent: Sep. 5, 1995

[54] EFFICIENT HARDWARE HANDLING OF POSITIVE AND NEGATIVE OVERFLOW RESULTING FROM ARITHMETIC OPERATIONS

[75] Inventors: Ruby B. Lee, Los Altos, Calif.; Joel D. Lamb, Fort Collins, Colo.

[73] Assignee: Hewlett-Packard Company, Palo Alto, Calif.

[21] Appl. No.: 163,960

[22] Filed: Dec. 8, 1993

[51] Int. Cl.[6] .......................... G06F 7/00; G06F 11/00
[52] U.S. Cl. ..................... 364/737; 364/736.5
[58] Field of Search .............. 364/715.04, 736, 736.5, 364/737, 745, 784

[56] References Cited

U.S. PATENT DOCUMENTS

| | | | |
|---|---|---|---|
| 4,722,066 | 1/1988 | Armer et al. | 364/745 |
| 4,811,268 | 3/1989 | Nishitani et al. | 364/745 |
| 4,945,507 | 7/1990 | Ishida et al. | 364/737 |
| 5,038,313 | 8/1991 | Kojima | 364/736.5 |
| 5,251,166 | 10/1993 | Ishida | 364/745 X |

OTHER PUBLICATIONS

Ruby B. Lee, *Precision Architecture*, IEEE Computer, vol. 22, No. 1, Jan. 1989, pp. 78–91.

*Primary Examiner*—Roy N. Envall, Jr.
*Assistant Examiner*—Chuong D. Ngo

[57] ABSTRACT

A computer system provides handling of positive and negative overflow. A first arithmetic operation is performed on a first n-bit unsigned binary operand and a second n-bit signed binary operand to produce an n-bit unsigned binary result. Overflow detection logic circuitry within the arithmetic logic unit detects positive overflow or negative overflow resulting from the arithmetic operation. When there is a positive overflow, saturation logic replaces the output of the two's complement adder with a value of $2^{n}-1$. When there is a negative overflow, the saturation logic replaces the output of the two's complement adder with a value of 0. In an alternate embodiment, a first arithmetic operation is performed on a first n-bit signed binary operand and a second n-bit signed binary operand to produce an n-bit positive signed binary result. For example the arithmetic operation is an addition or subtraction performed by a two's complement adder. In the alternate embodiment, overflow detection logic circuitry within the arithmetic logic unit detects positive overflow or negative overflow resulting from the arithmetic operation. When there is a positive overflow, saturation logic replaces the output of the two's complement adder with a value of $2^{n-1}-1$. When there is a negative overflow, the saturation logic replaces the output of the two's complement adder with a value of 0.

27 Claims, 12 Drawing Sheets

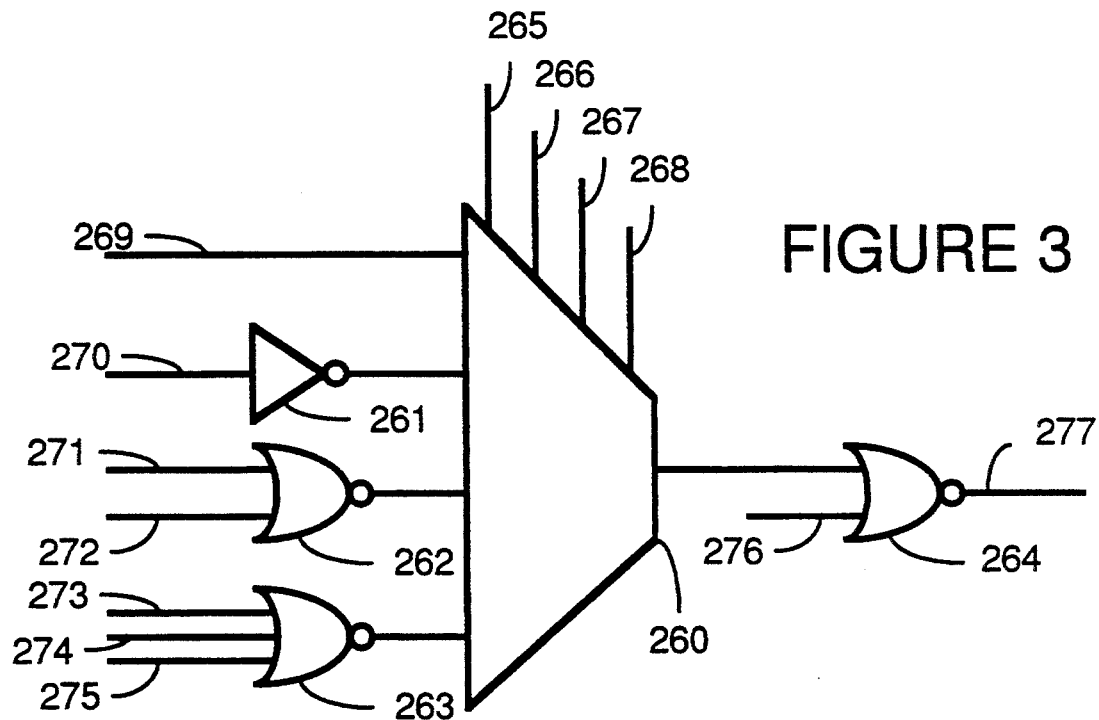
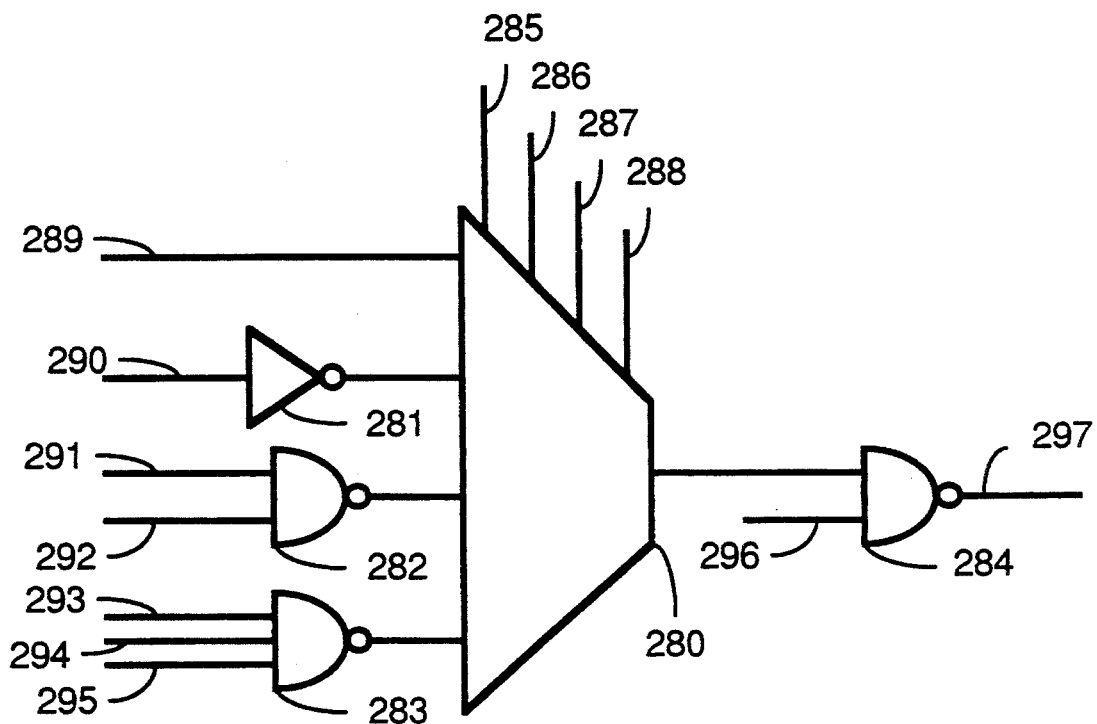
FIGURE 3

EFFICIENT HARDWARE HANDLING OF POSITIVE AND NEGATIVE OVERFLOW RESULTING FROM ARITHMETIC OPERATIONS

BACKGROUND

The present invention concerns a hardware implementation which handles positive and negative overflow resulting from arithmetic operations.

When performing arithmetic operations in a computing system positive overflow or negative overflow can occur. For example, when two n-bit integers are added by an arithmetic logic unit (ALU), n+1 bits of result are produced: an n-bit sum and a 1 bit carry-out. For operations using unsigned addition, when the carry-out is zero, then the sum gives the entire result. However, if the carry-out is 1, then "overflow" has occurred because representation of the result requires n+1 bits rather than n bits. For signed numbers, if the two operands have the same sign and the result has a different sign, then overflow has occurred. In the prior art, overflow has typically been handled by a trap to a software exception handler.

When overflow is rare, but must be detected, using a software trap handler is an acceptable practice. However when frequent overflows occur, the use of software traps to handle overflow can have a detrimental effect on system performance. In this case, rather than using a software trap, additional in-line software instructions may be added to the code after each arithmetic instruction. The additional software instructions check for overflow and, when present, adjusts the result or re-executes the code with more bits of precision.

In applications where overflow never occurs, then software trapping can be disabled and there is no requirement for in-line software checking for overflows. However, when positive and/or negative overflows are fairly frequent it is desirable to have a method of handling these overflows in an efficient manner without using software traps or additional in-line code.

SUMMARY OF THE INVENTION

In accordance with the preferred embodiment of the present invention, a computer system is presented which provides handling of positive and negative overflow. Positive overflow occurs when the result is greater than the largest number that may be represented by the bits allocated to represent the result. Negative overflow occurs when the result is less than the smallest number that may be represented by the bits allocated to represent the result. A first arithmetic operation is performed on a first n-bit unsigned binary operand and a second n-bit signed binary operand to produce an n-bit unsigned binary result. For example the arithmetic operation is an addition performed by a two's complement adder. In the preferred embodiment, overflow detection logic circuitry within the arithmetic logic unit detects positive overflow or negative overflow resulting from the arithmetic operation. When there is a positive overflow, saturation logic replaces the output of the two's complement adder with a value of $2^n - 1$. When there is a negative overflow, the saturation logic replaces the output of the two's complement adder with a value of 0.

The overflow detection logic circuitry determines there is positive overflow when a most significant bit of the first n-bit unsigned binary operand is equal to 1, a most significant bit of the second n-bit signed binary operand is equal to 0 and a most significant bit of the n-bit unsigned binary result is equal to 0. The overflow detection logic circuitry determines there is negative overflow when the most significant bit of the first n-bit unsigned binary operand is equal to 0, the most significant bit of the second n-bit signed binary operand is equal to 1 and the most significant bit of the n-bit unsigned binary result is equal to 1.

In the preferred embodiment of the present invention, different overflow schemes are implemented for different arithmetic operations. For example, a second arithmetic operation is performed on two n-bit signed binary operands to produce an n-bit signed binary result. In this case, the overflow detection logic circuitry within the arithmetic logic unit also detects positive overflow or negative overflow resulting from the arithmetic operation. When there is a positive overflow resulting from the second arithmetic operation, the saturation logic assigns a value of $2^{n-1} - 1$ to the n-bit signed binary result. When there is a negative overflow resulting from the second arithmetic operation, the saturation logic assigns a value of $-2^{n-1}$ to the n-bit signed binary result.

The overflow detection logic circuitry determines there is positive overflow in the second arithmetic operation when most significant bits for both of the two n-bit signed binary operands are equal to 0, and a most significant bit of the n-bit signed binary result is equal to 1. The overflow detection logic circuitry determines there is negative overflow in the second arithmetic operation when the most significant bits for both of the two n-bit signed binary operands are equal to 1, and the most significant bit of the n-bit signed binary result is equal to 0.

A third arithmetic operation is a subtraction operation using two n-bit unsigned operands. The overflow detection logic determines whether an (n+1)-bit signed binary intermediate result is negative. When the (n+1)-bit signed binary intermediate result is negative, the saturation logic performs a two's (or one's) complement operation of the (n+1)-bit signed binary intermediate result to produce a final n-bit unsigned result.

In the preferred embodiment, the various handling of positive and negative overflow may be overridden so that the output of the two's complement adder is used regardless of overflow.

In another embodiment of the present invention, a first arithmetic operation is performed on a first n-bit signed binary operand and a second n-bit signed binary operand to produce an n-bit positive signed binary result. For example the arithmetic operation is an addition or subtraction performed by a two's complement adder. In the alternate embodiment, overflow detection logic circuitry within the arithmetic logic unit detects positive overflow or negative overflow resulting from the arithmetic operation. When there is a positive overflow, saturation logic replaces the output of the two's complement adder with a value of $2^{n-1} - 1$. When there is a negative overflow, the saturation logic replaces the output of the two's complement adder with a value of 0.

The overflow detection logic circuitry determines there is positive overflow when a most significant bit of the first n-bit signed binary operand is equal to 0, a most significant bit of the second n-bit signed binary operand is equal to 0 and a most significant bit of the n-bit positive signed binary result is equal to 1. The overflow detection logic circuitry determines there is negative overflow when the most significant bit of the n-bit positive signed binary result is equal to 1 and one of either the most significant bit of the first n-bit signed binary operand or the most significant bit of the second n-bit signed binary operand is equal to 1.

The teaching of the present invention is also extendible to the case where a pre-shifter shifts an operand before receipt by the n-bit two's complement adder. In this case the overflow detection logic additionally detects positive or negative overflow resulting from the pre-shifter shifting the first n-bit signed or unsigned binary operand to the left before receipt by the n-bit two's complement adder.

In addition, the present invention works particularly well for computer systems which implement multiple operations in response to a single instruction. In this case, the first arithmetic operation is one of a plurality of parallel operations performed simultaneously in an arithmetic logic unit.

The present invention allows an increase in computer system performance for computations where positive overflow or negative overflow are not rare occurrences. The hardware implementation of the present invention facilitates the handling of positive and negative overflow without use of a software overflow trap handler or in-line instructions. The present invention also provides for a simple and effective hardware implementation which provides for versatility in the handling of positive and negative overflows.

BRIEF DESCRIPTION OF THE DRAWINGS

FIG. 3 shows logic which performs overflow calculations for a pre-shifter shown in FIG. 2 in accordance with a preferred embodiment of the present invention.

DESCRIPTION OF THE PREFERRED EMBODIMENT

Figure 1:
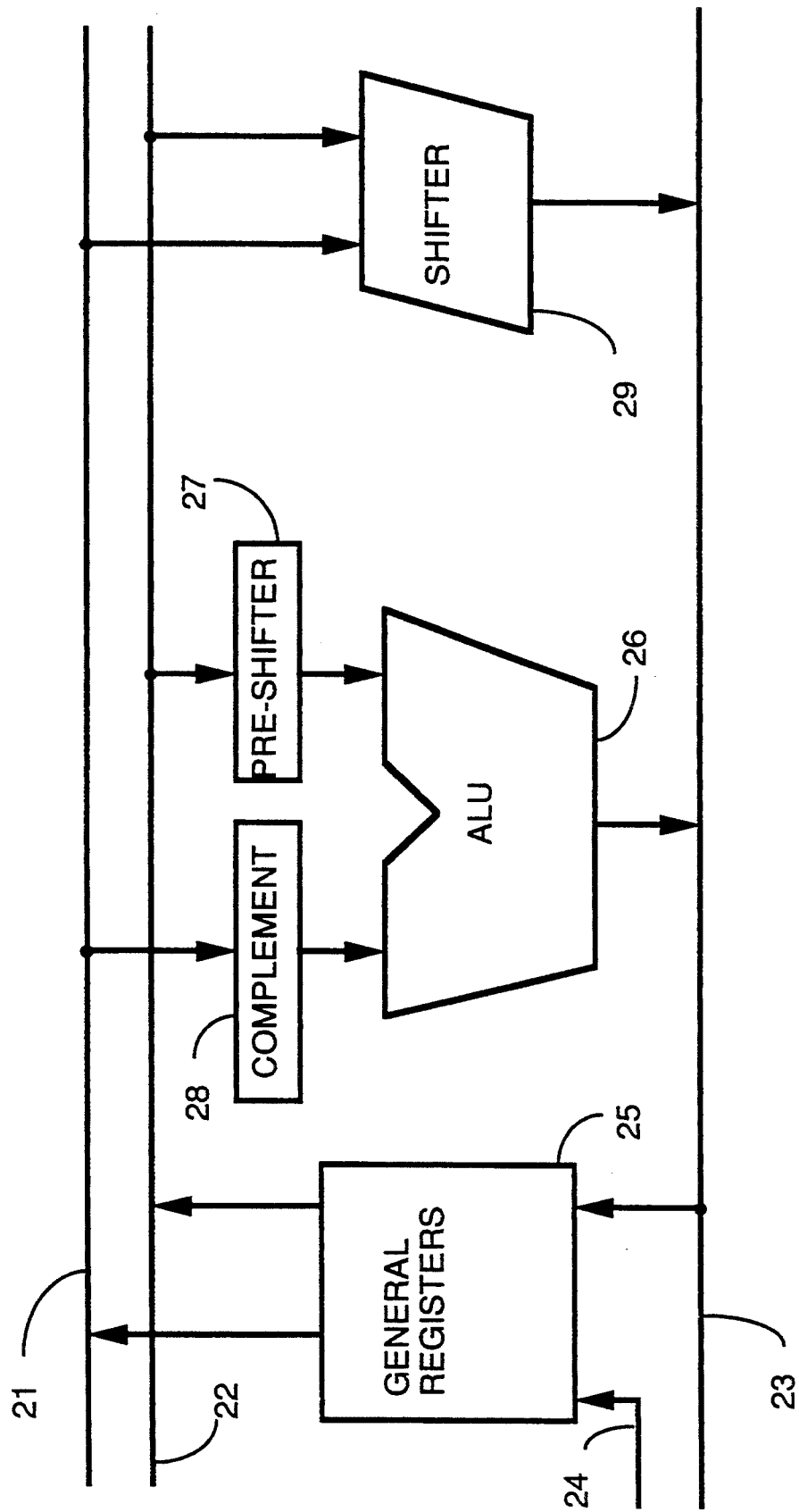
FIG. 1 shows a simplified block diagram of an operation execution data path within a processor in accordance with the prior art.

FIG. 1 shows a simplified block diagram of an operation execution data path within a processor in accordance with the prior art. Operands for upcoming operations and results from accomplished operations are stored within general registers 25. When operations are performed, a first operand stored in a first register within general registers 25 is placed on a first source bus 21. If the operation requires another operand, a second operand stored in a second register within general registers 25 is placed on a second source bus 22.

After performance of the operation, the result is placed on a result bus 23 and loaded into a register within general registers 25 or forwarded to other functional units. The operation is performed by arithmetic logic unit (ALU) 26 or by a shifter 29. A pre-shifter 27 and a complement circuitry 28 may each be used to modify operands before they are received by ALU 26. For example, for a subtraction operation, complement circuitry 28 is used to perform a two's complement on one of the operands before it is forwarded to an adder within ALU 26. For general background about the architecture of single processor system constructed similarly to the present invention see, for example, Ruby B. Lee, *Precision Architecture, IEEE Computer*, Volume 2, No. 1, January 1989, pp. 78-91.

Figure 2:
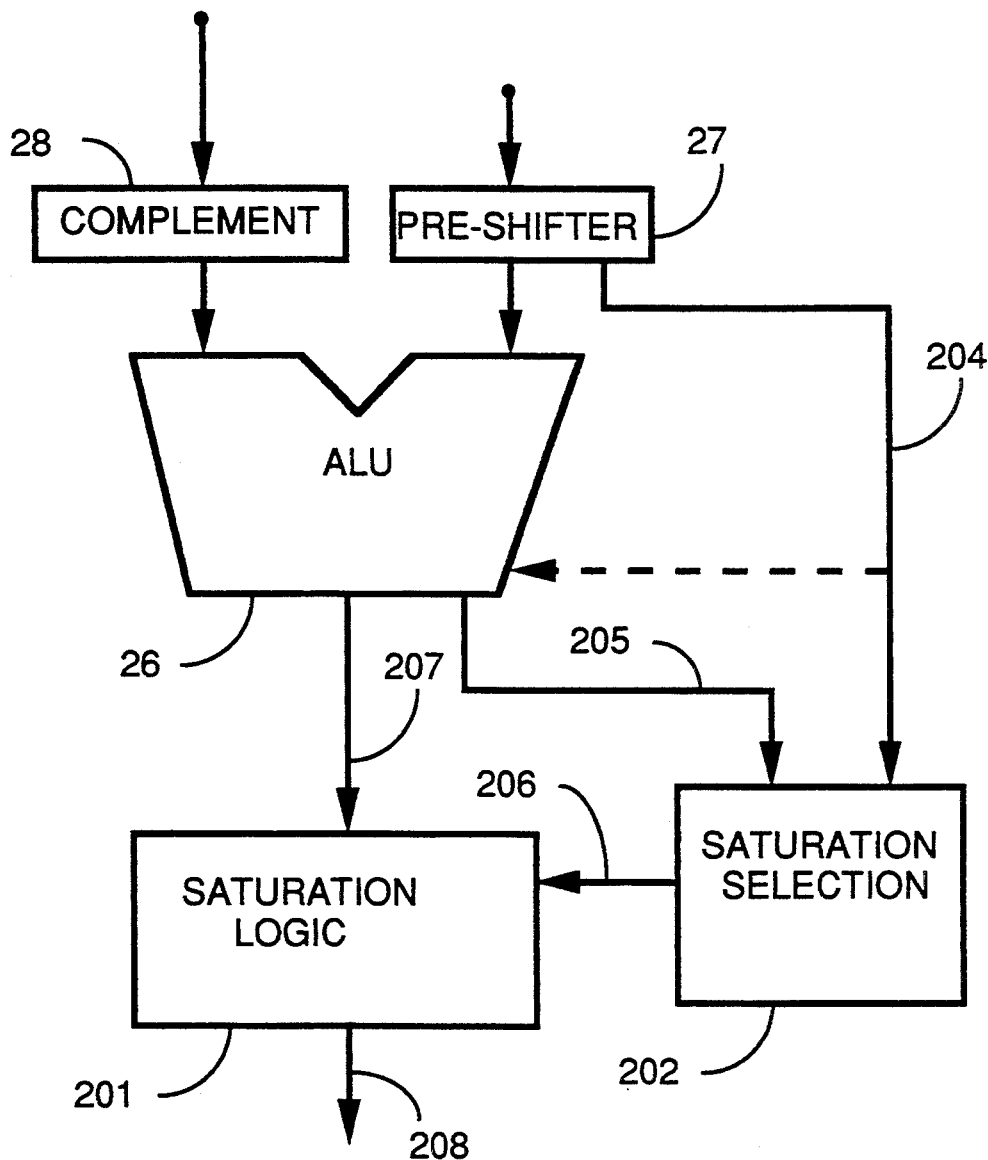
FIG. 2 shows a simplified block diagram of an operation execution data path within a processor in accordance with preferred embodiments of the present invention.

FIG. 2 shows how the operation execution data path within a processor may be modified to allow for hardware handling of positive and negative overflow resulting from arithmetic operations performed by ALU 26. As described below additional circuitry is added to pre-shifter 27 to generate overflow signals 204 and is added to ALU 26 to generate overflow signals 205. Overflow signals 204 and 205 are processed by a saturation selection block 202 to produce saturation selection signals 206. Alternately, overflow signals 204 may be received by ALU 26 and used in the generation of overflow signals 205. Based on saturation selection signals 206, saturation logic 201 operates on ALU results 207 from ALU 26 to produce overflow corrected results 208.

The operation performed by saturation selection block 202 and saturation logic 201 is the handling of overflow by use of saturation arithmetic. In saturation arithmetic, a result is restricted to "n" number of bits. When the result cannot be expressed in n bits, then the result is clipped to a value represented by n bits.

In the preferred embodiment of the present invention, overflow is handled in one of several ways, depending on selections by the executed instruction and the exact operation being performed.

The first overflow option is for an arithmetic operation performed on two n-bit signed two's complement operands and which produces an n-bit signed two's complement result. The largest n-bit signed two's complement number has a value of $2^{n-1}-1$. The smallest n-bit signed two's complement number has a value of $-2^{n-1}$. In the first overflow option, results which have a value larger than $2^{n-1}-1$ (positive overflow) are assigned the value of $2^{n-1}-1$. Results which have a value less than $-2^{n-1}$ (negative overflow) are assigned the value of $-2^{n-1}$.

The second overflow option is for an arithmetic operation performed on one n-bit signed two's complement number and one unsigned binary n-bit number and which produces an n-bit unsigned result. The largest n-bit signed two's complement number has a value of $2^{n-1}-1$. The smallest n-bit signed two's complement number has a value of $-2^{n-1}$. The largest n-bit unsigned binary number has a value of $2^n-1$. The smallest n-bit unsigned binary number has a value of 0. In the second overflow option, results which have a value larger than $2^n-1$ (positive overflow) are assigned the value of $2^n-1$. Results which have a value less than 0 (negative overflow) are assigned the value of 0.

The third overflow option is for an arithmetic operation performed on two n-bit unsigned binary numbers. The largest n-bit unsigned binary number has a value of $2^n-1$. The smallest n-bit unsigned binary number has a value of 0. In the third overflow option, modular (wrap-around) arithmetic is implemented. Results which have a value larger than $2^n-1$ (positive overflow) are wrapped around and are assigned a value beginning with 0 based on the amount of negative overflow. For example, a result that overflows $2^n-1$ by 1 is assigned the value of 0, a result that overflows $2^n-1$ by 2 is assigned the value of 1, a result that overflows $2^n-1$ by 3 is assigned the value of 2, and so on. Results which have a value smaller than 0 (negative overflow) are wrapped around and are assigned a value beginning with $2^n-1$ based on the amount of overflow. For example, a result that negative overflows 0 by 1 is assigned the value of $2^n-1$, a result that negative overflows 0 by 2 is assigned the value of $2^n-2$, a result that negative overflows $2^n-1$ by 3 is assigned the value of $2^n-3$, and so on. As will be understood by those of skill in the art, the third overflow option also works equally well for n-bit signed binary numbers.

The fourth overflow option is for subtraction with two unsigned binary n-bit numbers within the range of 0 and $2^{n-1}$. The subtraction produces an (n+1)-bit signed binary number, n bits for the difference and one bit for the sign. However, the absolute value of the difference between two unsigned binary n-bit numbers is an n-bit unsigned number within the range of 0 and $2^{n-1}$. In this case, negative overflow is handled by taking the absolute value of the result. This means that if the result is negative, it is replaced with the two's (or one's) complement value. Positive overflow cannot occur in subtraction with two unsigned numbers.

The fifth overflow option deals with two signed operands, and produces a positive signed result in the range of 0 to $2^{n-1}-1$.

The first overflow option is implemented by examining the most significant bit (sign bit) of the first operand ("$A_n$"), the most significant bit (sign bit) of the second operand ("$B_n$") and the most significant bit (sign bit) of the result ("$C_n$"). For an addition or subtraction using the first overflow option, positive overflow occurs when the sign bits of the operands are both equal to 0 and the sign bit of the result is equal to 1. This may be represented as in Equation 1 below:

$(A_n=B_n=0)$ AND $(C_n=1)$ \hfill Equation 1

When there is positive overflow, results are assigned the value of $2^{n-1}-1$.

Similarly, for an addition using the first overflow option, negative overflow occurs when the sign bits of the operands are both equal to 1 and the sign bit of the result is equal to 0. This may be represented as in Equation 2 below:

$(A_n=B_n=1)$ AND $(C_n=0)$ \hfill Equation 2

When there is negative overflow, results are assigned the value of $-2^{n-1}$.

The second overflow option is also implemented by examining the most significant bit of the first (unsigned binary n-bit) operand ("$A_n$"), the most significant bit (sign bit) of the second (n-bit signed two's complement) operand ("$B_n$") and the most significant bit of the (unsigned binary n-bit) result ("$C_n$"). For an addition or subtraction using the second overflow option, positive overflow occurs when the sign bit of the second operand and the most significant bit of the result are both equal to 0 and the most significant bit of the first operand is equal to 1. This may be represented as in Equation 3 below:

$(B_n=C_n=0)$ AND $(A_n=1)$ \hfill Equation 3

When there is positive overflow, results are assigned the value of $2^n-1$.

Likewise, for an addition or subtraction using the second overflow option, negative overflow occurs when the sign bits of the second operand and the most significant bit of the result are both equal to 1 and the most significant bit of the first operand is equal to 0. This may be represented as in Equation 4 below:

$(B_n=C_n=1)$ AND $(A_n=0)$ \hfill Equation 4

When there is negative overflow, results are assigned the value of 0.

The third overflow option is implemented by the operation of a standard two's complement n-bit adder. No additional modification to the output is necessary.

The fourth overflow option is implemented by performing the subtraction and when the intermediate result is negative, performing a two's (or one's) complement on the intermediate result to form the final result. Overflow for the fourth overflow option may be detected by equation 5 set out below for the case where $A-B=C$:

$(A_n=0$ AND $B_n=1)$ OR $(A_n=B_n$ AND $C_n=1)$ \hfill Equation 5

Other saturation options may be utilized in accordance with embodiments of the present invention. For example, in a fifth option, the first and the second operands are signed n-bit numbers in the range of $-2^{n-1}$ to $2^{n-1}-1$. The result is a positive signed n-bit number in the range of 0 to $2^{n-1}-1$. Positive overflow occurs when both operands are positive and the most significant bit of the result is 1. Negative overflow occurs when at least one of the operands is negative and the sign of the result is negative or when both operands are negative. To detect positive overflow, logic is used in accordance with Equation 6 below:

$(A_n=B_n=0)$ AND $(C_n=1)$ \hfill Equation 6

To detect negative overflow, logic is used in accordance with Equation 7 below:

$((A_n=1$ OR $B_n=1)$ AND $(C_n=1))$ OR $(A_n=B_n=1)$ \hfill Equation 7

In the fifth overflow option, when there is positive overflow, the result is saturated to $2^{n-1}-1$. When there is negative overflow, the result is saturated to 0.

Although requiring greater complexity, the preferred embodiment of the present invention also takes into account overflow resulting from the use of pre-shifter 27. FIGS. 3, 4, 5 and 6 show logic which implements the preferred embodiment of the present invention. The logic shows implementation for the arithmetic operations of add, subtract, shift-and-add, and shift-and-subtract.

FIG. 3 shows logic added to pre-shifter 27 to allow calculation of an overflow condition. In the preferred embodiment, pre-shifter 27 can shift a first operand to the left or to the right zero, one, two, or three bits before the first operand is forwarded to ALU 26. The logic in FIG. 3 detects when an overflow has occurred in shifting bits of the first operand to the left one, two, or three bits.

The logic in pre-shifter 27 which detects shifter positive signed overflow includes a multiplexor 260, an inverter 261, a logical NOR gate 262, a logical NOR gate 263 and a logical NOR gate 264. The high order bit of the pre-shifter operand is connected to an input 276 of logical NOR gate 264. The second highest order bit of the pre-shifter operand is connected to an input 270 of inverter 261, to an input 271 of logical NOR gate 262 and to an input 273 of logical NOR gate 263. The third highest order bit of the pre-shifter operand is connected to an input 272 of logical NOR gate 262 and to an input 274 of logical NOR gate 263. The fourth highest order bit of the pre-shifter operand is connected to an input 275 of logical NOR gate 263. A logic one (VDD) signal is connected to input 269 of multiplexor 260.

For operations for which the pre-shifter operand is not shifted or is shifted right, a zero shift select signal on line 265 is activated so that multiplexor 260 selects the value on line 269 to be forwarded to logic NOR gate 264. For operations for which the pre-shifter operand is shifted one bit to the left, a one bit left shift select signal on line 266 is activated so that multiplexor 260 selects the value from inverter 261 to be forwarded to logic NOR gate 264. For operations for which the pre-shifter operand is shifted two bits to the left, a two bit left shift select signal on line 267 is activated so that multiplexor 260 selects the value from logic NOR gate 262 to be forwarded to logic NOR gate 264. For operations for which the pre-shifter operand is shifted three bits to the left, a three bit left shift select signal on line 268 is activated so that multiplexor 260 selects the value from logic NOR gate 263 to be forwarded to logic NOR gate 264. When a first pre-shifter overflow signal on line 277 is at logic one, this indicates that a shifter positive signed overflow has occurred.

The logic in pre-shifter 27 which detects shifter negative signed overflow includes a multiplexor 280, an inverter 281, a logical NAND gate 282, a logical NAND gate 283 and a logical NAND gate 284. The high order bit of the pre-shifter operand is connected to an input 296 of logical NAND gate 284. The second highest order bit of the pre-shifter operand is connected to an input 290 of inverter 281, to an input 291 of logical NAND gate 282 and to an input 293 of logical NAND gate 283. The third highest order bit of the pre-shifter operand is connected to an input 292 of logical NAND gate 282 and to an input 294 of logical NAND gate 283. The fourth highest order bit of the pre-shifter operand is connected to an input 295 of logical NAND gate 283. A logic 0 (GND) signal is connected to input 289 of multiplexor 280.

For operations for which the pre-shifter operand is not shifted or is shifted right, a zero shift select signal on line 285 is activated so that multiplexor 280 selects the value on line 289 to be forwarded to logic NAND gate 284. For operations for which the pre-shifter operand is shifted one bit to the left, a one bit left shift select signal on line 286 is activated so that multiplexor 280 selects the value from inverter 281 to be forwarded to logic NAND gate 284. For operations for which the pre-shifter operand is shifted two bits to the left, a two bit left shift select signal on line 287 is activated so that multiplexor 280 selects the value from logic NAND gate 282 to be forwarded to logic NAND gate 284. For operations for which the pre-shifter operand is shifted three bits to the left, a three bit left shift select signal on line 288 is activated so that multiplexor 280 selects the value from logic NAND gate 283 to be forwarded to logic NAND gate 284. When a second pre-shifter overflow signal on line 297 is at logic zero, this indicates that a shifter negative signed overflow has occurred.

Figure 4:
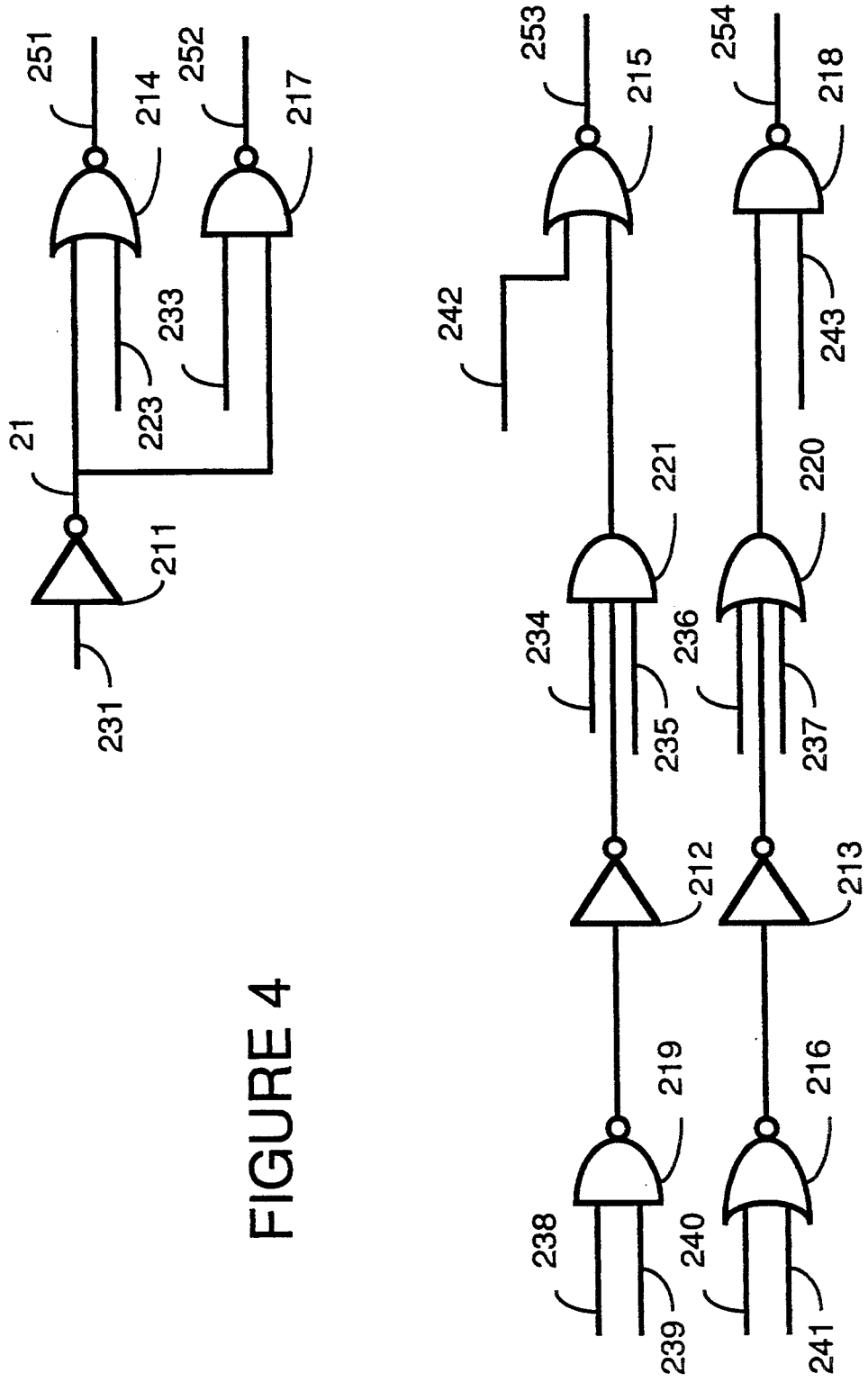
FIG. 4 shows logic which performs overflow calculations for an arithmetic logic unit (ALU) shown in FIG. 2 in accordance with a preferred embodiment of the present invention.

FIG. 4 shows overflow logic within ALU 26 which performs overflow calculation and which takes into account the results from the pre-shifter logic shown in FIG. 3. An adder within ALU 26 receives a first adder operand from pre-shifter 27 and a second adder operand from complement circuitry 28.

The logic within ALU 26 which performs overflow calculations includes an inverter 211, an inverter 212, an inverter 213, a logic NOR gate 214, a logic NOR gate 215, a logic NOR gate 216, a logic NAND gate 217, a logic NAND gate 218, a logic NAND gate 219, a logic OR gate 220 and a logic AND gate 221. On an input 231 of inverter 211 is placed the inverted value of the high order bit of the second adder operand. On an input 238 of logic NAND gate 219 is placed the inverted value of the high order bit of the first adder operand. On an input 239 of logic NAND gate 219 is placed the inverted value of the high order bit of the second adder operand. On an input 240 of logic NOR gate 216 is placed the inverted value of the high order bit of the first adder operand. On an input 241 of logic NOR gate 216 is placed the inverted value of the high order bit of the second adder operand.

On an input 223 of logic NOR gate 214 is placed the inverted value of the carry-out of the high order of the adder result. On an input 233 of logic NAND gate 217 is placed the inverted value of the carry-out of the high order bit of the adder result. On an input 242 of logic NOR gate 215 is placed the first pre-shifter overflow signal from line 277. On an input 243 of logic NAND gate 218 is placed the second pre-shifter overflow signal from line 297. On an input 234 of logic AND gate 221 is placed the value of the carry-out from second most significant bit of the adder result. On an input 235 of logic AND gate 221 is placed the second pre-shifter overflow signal from line 297. On an input 236 of logic OR gate 220 is placed the first pre-shifter overflow signal from line 277. On an input 237 of logic OR gate 220 is placed the value of the carry-out from the second most significant bit of the adder result.

As illustrated in the logic shown in FIG. 4, the carry-out from the second most significant bit of the adder result can be used rather than the carry-out from the most significant bit of the result to calculate overflow. As may be understood by those skilled in the art, essentially the carry-out from the second most significant bit and the inputs to the most significant bit can be used to derive the information contained in the carry-out from the most significant bit. This allows a slight performance increase as it is not necessary to wait for calculation of the carryout from the most significant bit.

The overflow logic within ALU 26 produces four adder overflow signals. A first adder overflow signal on line 251 is logic one when there is a positive overflow which results from an operation on a signed operand and an unsigned operand. A second adder overflow signal on line 252 is logic zero when there is a negative overflow which results from an operation on a signed operand and an unsigned operand. A third adder overflow signal on line 253 is logic zero when there is a positive overflow which results from an operation on two signed operands. A fourth adder overflow signal on line 254 is logic one when there is a negative overflow which results from an operation on two signed operands.

Figure 5:
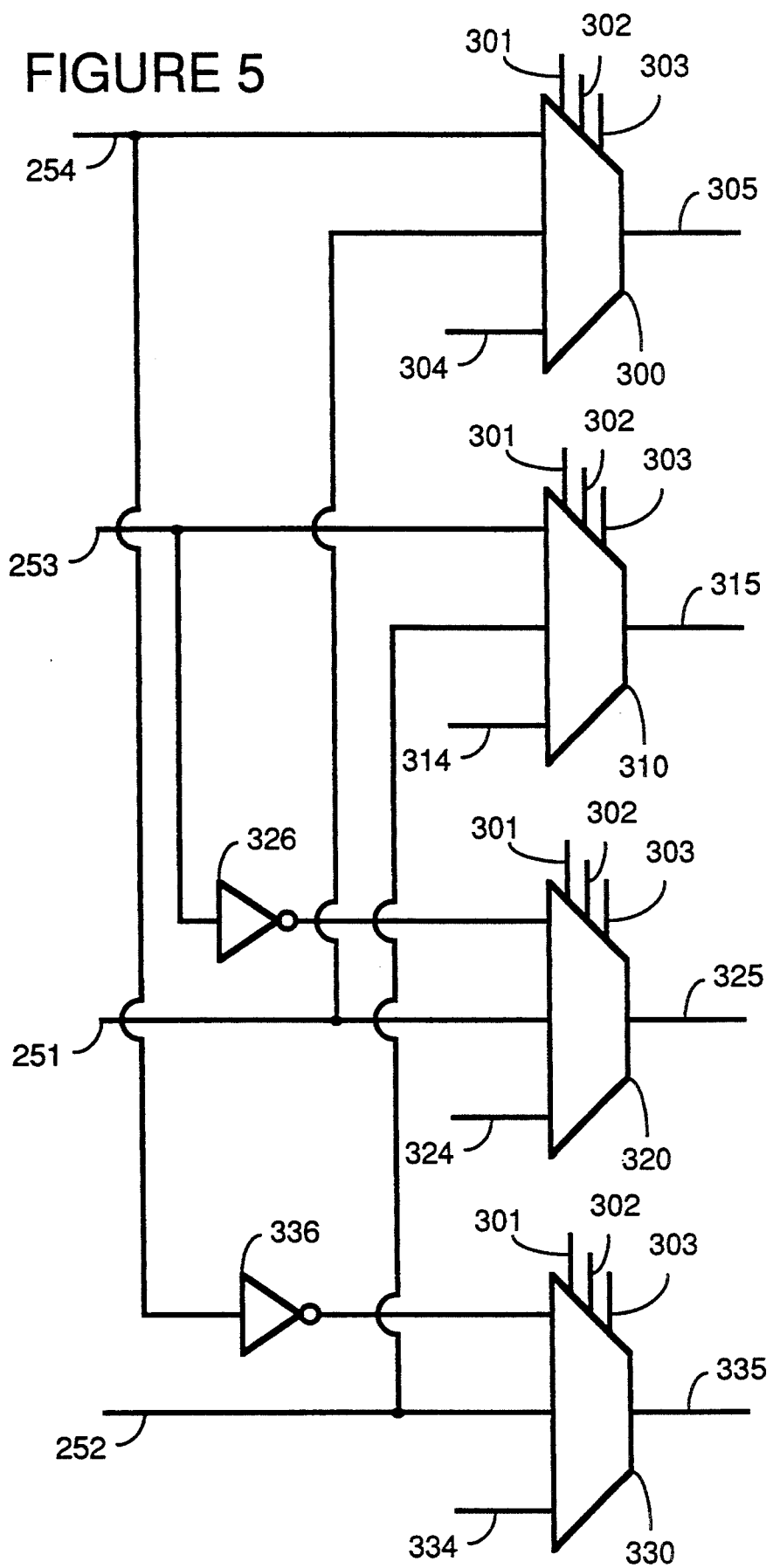
FIG. 5 shows logic which implements a saturation selection logic block shown in FIG. 2 in accordance with a preferred embodiment of the present invention.

FIG. 5 shows a block logic diagram of saturation selection logic 202. Saturation selection logic 202 includes a multiplexor 300, a multiplexor 310, a multiplexor 320, a multiplexor 330, an inverter 326 and an inverter 336. Saturation selection logic 202 receives first, second, third and fourth adder overflow signals on lines 251, 252, 253 and 254, respectively as shown. A logic zero (Ground) signal is placed on an input line 304 of multiplexor 300. A logic one (VDD) signal is placed on an input line 314 of multiplexor 310. A logic zero (Ground) signal is placed on an input line 324 of multiplexor 320. A logic one (VDD) signal is placed on an input line 334 of multiplexor 330.

Multiplexor 300, multiplexor 310, multiplexor 320 and multiplexor 330 are controlled by three selection signals. When an operation is selected to be an operation in which a saturation overflow scheme is chosen for two signed operands, a first selection signal on line 301 is set at logic 1 and multiplexor 300, multiplexor 310, multiplexor 320 and multiplexor 330 each select their top input to forward to their output. When an operation is selected to be an operation in which a saturation scheme is chosen for one signed operand and one unsigned operand, a second selection signal on line 302 is set at logic 1 and multiplexor 300, multiplexor 310, multiplexor 320 and multiplexor 330 each select their middle input to forward to their output. When an operation is selected to be an operation in which a no saturation overflow occurs, a third selection signal on line 303 is set at logic 1 and multiplexor 300, multiplexor 310, multiplexor 320 and multiplexor 330 each select their bottom input to forward to their output.

Saturation selection logic 202 produces a first selection saturation signal on a line 305, a second selection saturation signal on a line 315, a third selection saturation signal on a line 325 and a fourth selection saturation signal on a line 335. When the first selection saturation signal is at logic one, saturation logic 201 is instructed to force the most significant bit of the result to logic one. When the second selection saturation signal is at logic zero, saturation logic 201 is instructed to force the most significant bit of the result to logic zero. When the third selection saturation signal is at logic one, saturation logic 201 is instructed to force the all but the most significant bit of the result to logic one. When the fourth selection saturation signal is at logic zero, saturation logic 201 is instructed to force all but the most significant bit of the result to logic zero.

Figure 6:
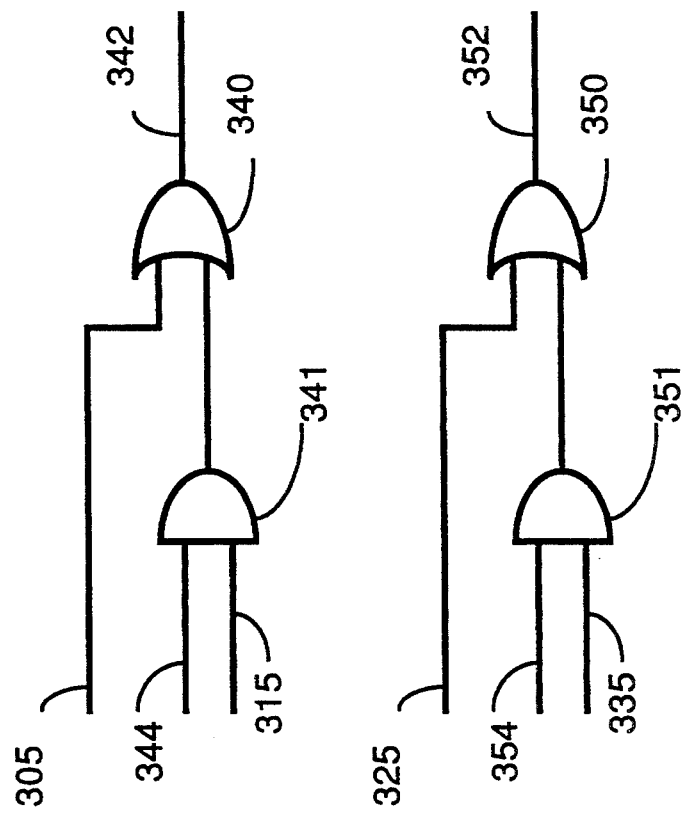
FIG. 6 shows saturation logic which is used to present an arithmetic result for the arithmetic logic unit (ALU) shown in FIG. 2 in accordance with a preferred embodiment of the present invention.

FIG. 6 shows a logic block diagram of saturation logic 201. Saturation logic 201 includes a logic AND gate 341, logic OR gate 340, logic AND gate 351 and logic OR gate 350. Logic AND gate 351 and logic OR gate 350 are duplicated for every bit but the most significant bit of ALU results 207.

In order to produce the most significant bit of overflow corrected results 208 on line 342, saturation logic 201 receives the most significant bit of ALU results 207 on a line 344, the first selection saturation signal on line 305 and the second selection saturation signal on line 315.

In order to produce each bit other than the most significant bit of overflow corrected results 208, logic AND gate 351 and logic OR gate 350 are duplicated for each bit. For each bit other than the most significant bit of overflow corrected results 208, saturation logic 201 receives the bit of ALU results 207 on a line 354, the third selection saturation signal on line 325 and the fourth selection saturation signal on line 335 and produces the corresponding bit of overflow corrected results 208 on line 352.

By placing an inverter after or in parallel with the logic shown in FIG. 6, a one's complement operation as discussed in the fourth overflow option above may be implemented. As will be clear to those of ordinary skill in the art, to implement a two's complement operation, for the fourth overflow option, a carry-in of one is also needed.

Figure 11:
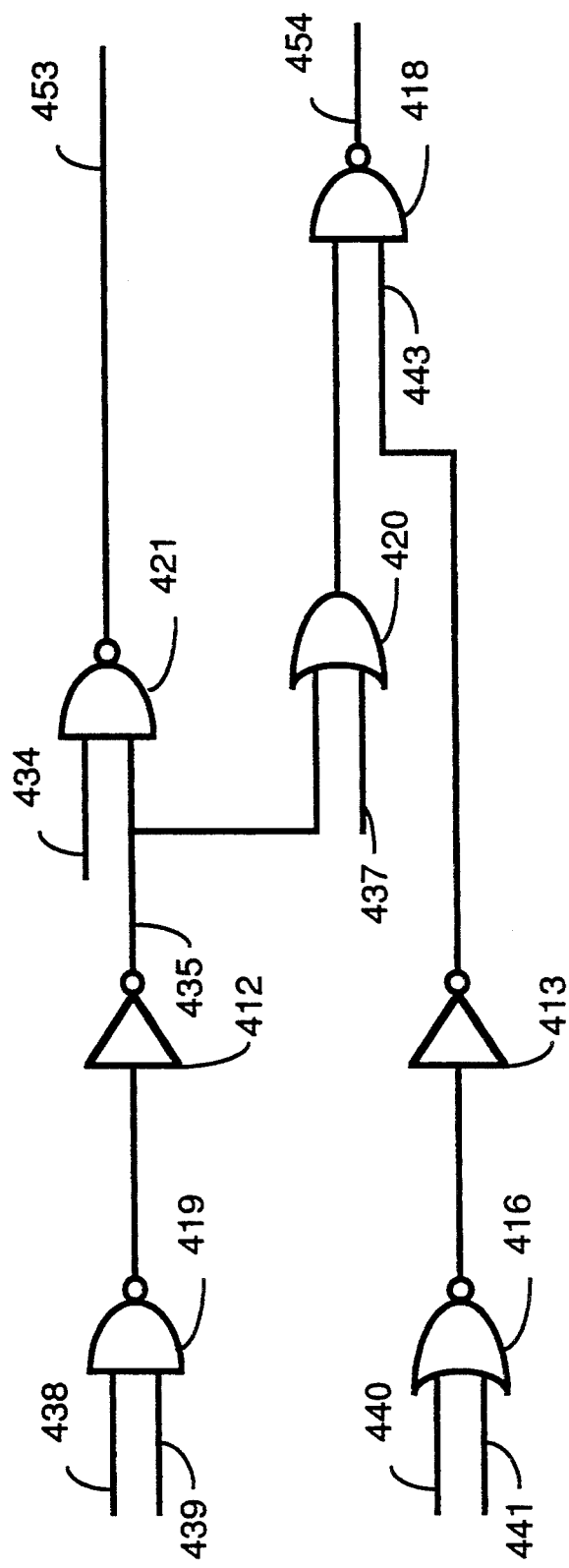
FIG. 11 shows logic which performs overflow calculations for an arithmetic logic unit (ALU) shown in FIG. 2 in accordance with another preferred embodiment of the present invention.

Additional logic needs to be added to implement the fifth option. FIG. 11 shows overflow logic within ALU 26 for the fifth option which performs overflow calculation and which takes into account the results from the pre-shifter logic shown in FIG. 3. The logic within ALU 26 which performs overflow calculations for the fifth option includes an inverter 412, an inverter 413, a logic NOR gate 416, a logic NAND gate 418, a logic NAND gate 419, a logic OR gate 420 and a logic NAND gate 421. On an input 438 of logic NAND gate 419 is placed the inverted value of the high order bit of the first adder operand. On an input 439 of logic NAND gate 419 is placed the inverted value of the high order bit of the second adder operand. On an input 440 of logic NOR gate 416 is placed the inverted value of the high order bit of the first adder operand. On an input 441 of logic NOR gate 416 is placed the inverted value of the high order bit of the second adder operand.

On an input 434 of logic NAND gate 421 is placed the value of the carry-out from the next to the most significant bit (i.e., the carry-in to the most significant bit) of the adder result. On an input 437 of logic OR gate 420 is placed the value of the carry-out from the next to the most significant bit (i.e., the carry-in to the most significant bit) of the adder result.

The overflow logic within ALU 26 for the fifth option produces two adder overflow signals. A first adder overflow signal on line 453 is logic zero when there is a positive overflow which results from an operation on two signed operands. A second adder overflow signal on line 454 is logic one when there is a negative overflow which results from an operation on two signed operands.

Figure 12:
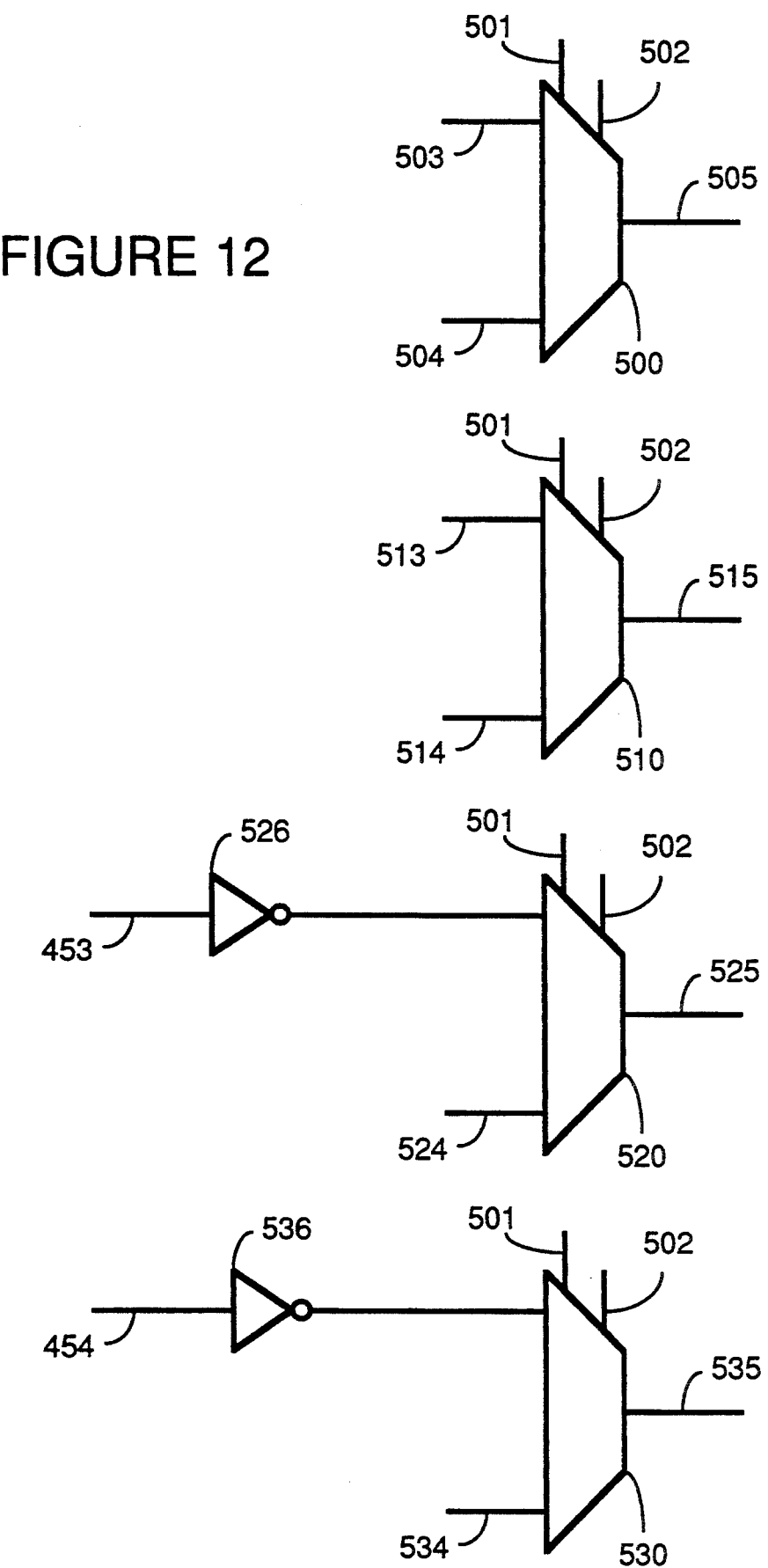
FIG. 12 shows logic which implements a saturation selection logic block shown in FIG. 2 in accordance with another preferred embodiment of the present invention.

FIG. 12 shows a block logic diagram of saturation selection logic 202 for the fifth option. Saturation selection logic 202 includes a multiplexor 500, a multiplexor 510, a multiplexor 520, a multiplexor 530, an inverter 526 and an inverter 536. Saturation selection logic 202 for the fifth option receives first and second adder overflow signals on lines 453 and 454, respectively as shown. A logic zero (Ground) signal is placed on an input lines 503 and 504 of multiplexor 500. A logic zero (Ground) signal is placed on an input lines 513 of multiplexor 510. A logic one (VDD) signal is placed on an input line 514 of multiplexor 510. A logic zero (Ground) signal is placed on an input line 524 of multiplexor 520. A logic one (VDD) signal is placed on an input line 534 of multiplexor 530.

Multiplexor 500, multiplexor 510, multiplexor 520 and multiplexor 530 are controlled by two selection signals. When an operation is selected to be an operation in which a saturation overflow scheme is chosen for two signed operands in accordance with the fifth option, a first selection signal on line 501 is set at logic 1 and multiplexor 500, multiplexor 510, multiplexor 520 and multiplexor 530 each select their top input to forward to their output. When an operation is selected to be an operation in which a no saturation overflow occurs, a second selection signal on line 502 is set at logic 1 and multiplexor 500, multiplexor 510, multiplexor 520 and multiplexor 530 each select their bottom input to forward to their output.

Saturation selection logic 202 for the fifth option produces a first selection saturation signal on a line 505, a second selection saturation signal on a line 515, a third selection saturation signal on a line 525 and a fourth selection saturation signal on a line 535. When the first selection saturation signal is at logic one, saturation logic 201 is instructed to force the most significant bit of the result to logic one. When the second selection saturation signal is at logic zero, saturation logic 201 is instructed to force the most significant bit of the result to logic zero. When the third selection saturation signal is at logic one, saturation logic 201 is instructed to force the all but the most significant bit of the result to logic one. When the fourth selection saturation signal is at logic zero, saturation logic 201 is instructed to force all but the most significant bit of the result to logic zero.

While the above discussion of the present invention has discussed operation using a non-partitioned ALU. The present invention is also very useful when the ALU is partitioned to allow parallel data processing. Then separate overflow hardware may be used for each partition of the ALU.

Figure 7:
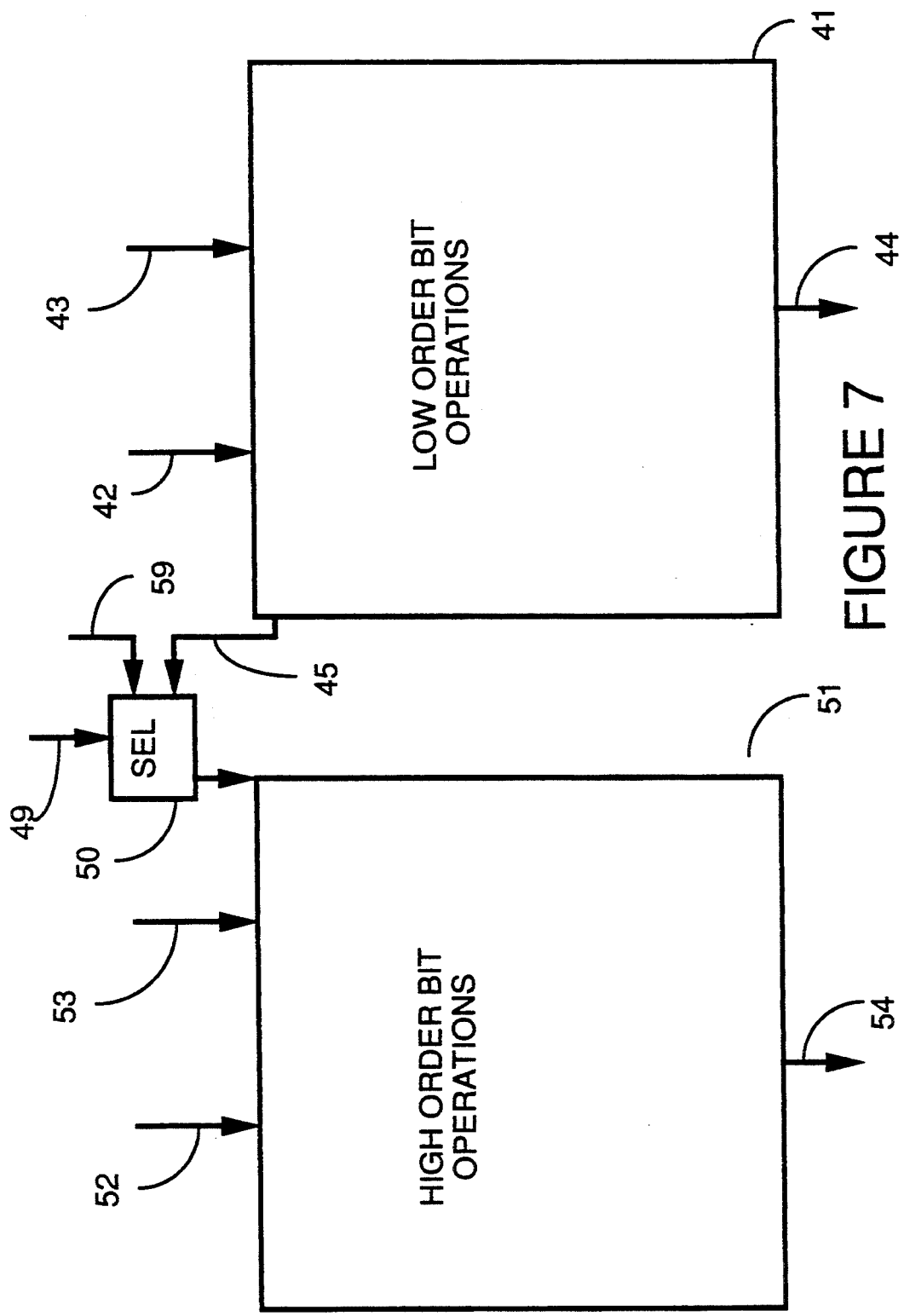
FIG. 7 shows a simplified block diagram of the arithmetic logic unit (ALU) shown in FIG. 2 in accordance with an alternate preferred embodiment of the present invention.

For example, FIG. 7 shows ALU 26 divided into two partitions. A first partition 41 performs operations on low order bits 42 of a first operand and low order bits 43 of a second operand to produce low order bit results 44. A second partition 51 performs operations on high order bits 52 of the first operand and high order bits 53 of the second operand to produce high order bit results 54.

In response to a control input 49, a selector 50 is used to allow information on data path 45 to propagate from first partition 41 to second partition 51 or to intercept information on data path 45 before it is propagated from first partition 41 to second partition 51. Particularly, for arithmetic operations performed on full-word operands, information is allowed to propagate from first partition 41 through selector 50 to second partition 51. For the performance of parallel arithmetic operations on half-word operands, selector 50 prevents information from propagating from first partition 41 to second partition 51. Generally, in logic operations, there is no propagation of information from first partition 41 to second partition 51.

For example, in a computer which has a thirty-two bit wide data path, each full-word operand is 32 bits. Therefore, when performing operations using 32-bit full word operands, selector 50 allows information to propagate from first partition 41 through selector 50 to second partition 51. When performing two parallel operations using 16-bit half word operands, selector 50 prevents information from propagating from first partition 41 through selector 50 to second partition 51. Instead the value on a line 59 is forwarded to partition 51. When an "add" is being performed, a logic 0 is placed on input line 59. When a "subtract" is being performed, a logic 1 is placed on input line 59.

In the preferred embodiment of the present invention, a common arithmetic operation performed by ALU 26, shown in FIG. 1, is two's complement addition. As is understood by those skilled in the art, the use of two's complement circuitry 28 to perform a two's complement on an operand before performing a two's complement addition operation in the ALU implements a two's complement subtraction. Also, the use of pre-shifter 27 to pre-shift an operand before performing a two's complement addition operation in the ALU implements a shift and add operation.

Figure 8:
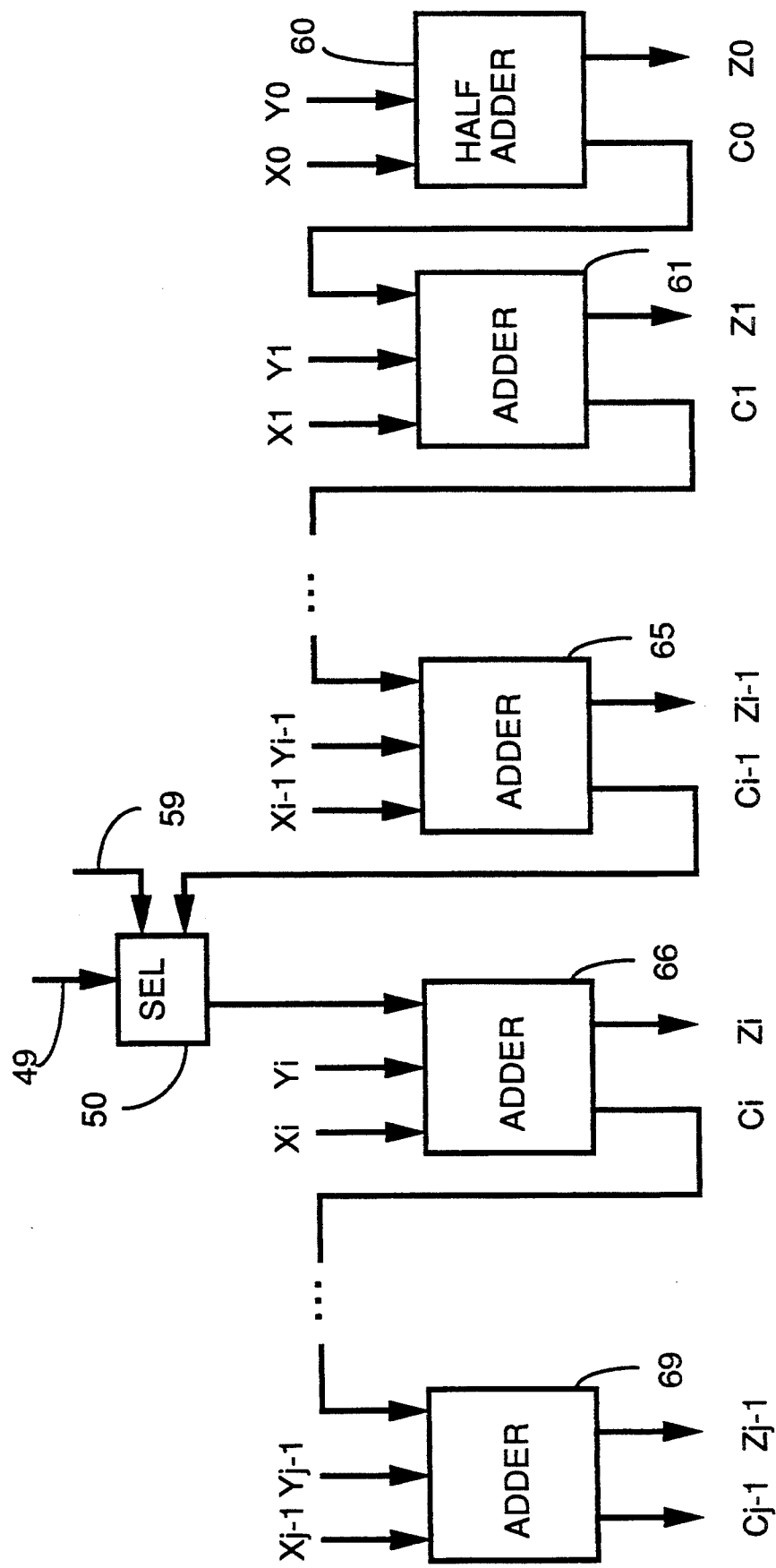
FIG. 8 shows implementation of a two's complement adder within the ALU shown in FIG. 2 in accordance with a preferred embodiment of the present invention.

FIG. 8 shows an implementation of a two's complement adder with carry propagate addition within ALU 26 in accordance with a preferred embodiment of the present invention. Alternately, ALU 26 includes a two's complement adder with carry look-ahead. A half adder 60 receives a single bit $X_0$ of a first operand and a single bit $Y_0$ of a second operand. Half adder 60 produces a sum bit $Z_0$ and a carry bit $C_0$. A full adder 61 receives a single bit $X_1$ of the first operand, a single bit $Y_1$ of the second operand and carry bit $C_0$. Full adder 61 produces a sum bit $Z_1$ and a carry bit $C_1$. A full adder 65 receives a single bit $X_{i-1}$ of the first operand, a single bit $Y_{i-1}$ of the second operand and a carry bit from a previous adder (i.e., $C_{i-2}$, not shown). Full adder 65 produces a sum bit $Z_{i-1}$ and a carry bit $C_{i-1}$. A full adder 66 receives a single bit $X_i$ of the first operand and a single bit $Y_i$ of the second operand. Depending on a value of enable bit 49, full adder 66 also receives, through selector 50 (or equivalent logic circuitry as will be understood by persons of ordinary skill in the art), carry bit $C_{i-1}$. Full adder 66 produces a sum bit $Z_i$ and a carry bit $C_i$. A full adder 69 receives a single bit $X_{j-1}$ of the first operand, a single bit $Y_{j-1}$ of the second operand and a carry bit from a previous adder (not shown). Full adder 69 produces a sum bit $Z_{j-1}$ and a carry bit $C_{j-1}$.

In the embodiment of the adder shown in FIG. 8, "j" is the size of the data path and the bit length of full word operations. Also, "i" is equal to "j" divided by 2. For example, "j" is equal to 32 and "i" is equal to 16. As will be understood in the art, "j" can be any value, and "i" can be any value less than "j".

Selector 50 is also shown in FIG. 8. When performing operations using "j"-bit full word operands, enable bit 49 is equal to logic one and allows a carry to propagate through selector 50 to full adder 66. When performing two parallel operations using "i"-bit half word operands, enable bit 49 is equal to logic zero and prevents the carry from propagating through selector 50 to full adder 66. Instead the value on line 59 is forwarded to full adder 66. When an "add" is being performed, a logic 0 is placed on input line 59. When a "subtract" is being performed, a logic 1 is placed on input line 59.

Figure 9:
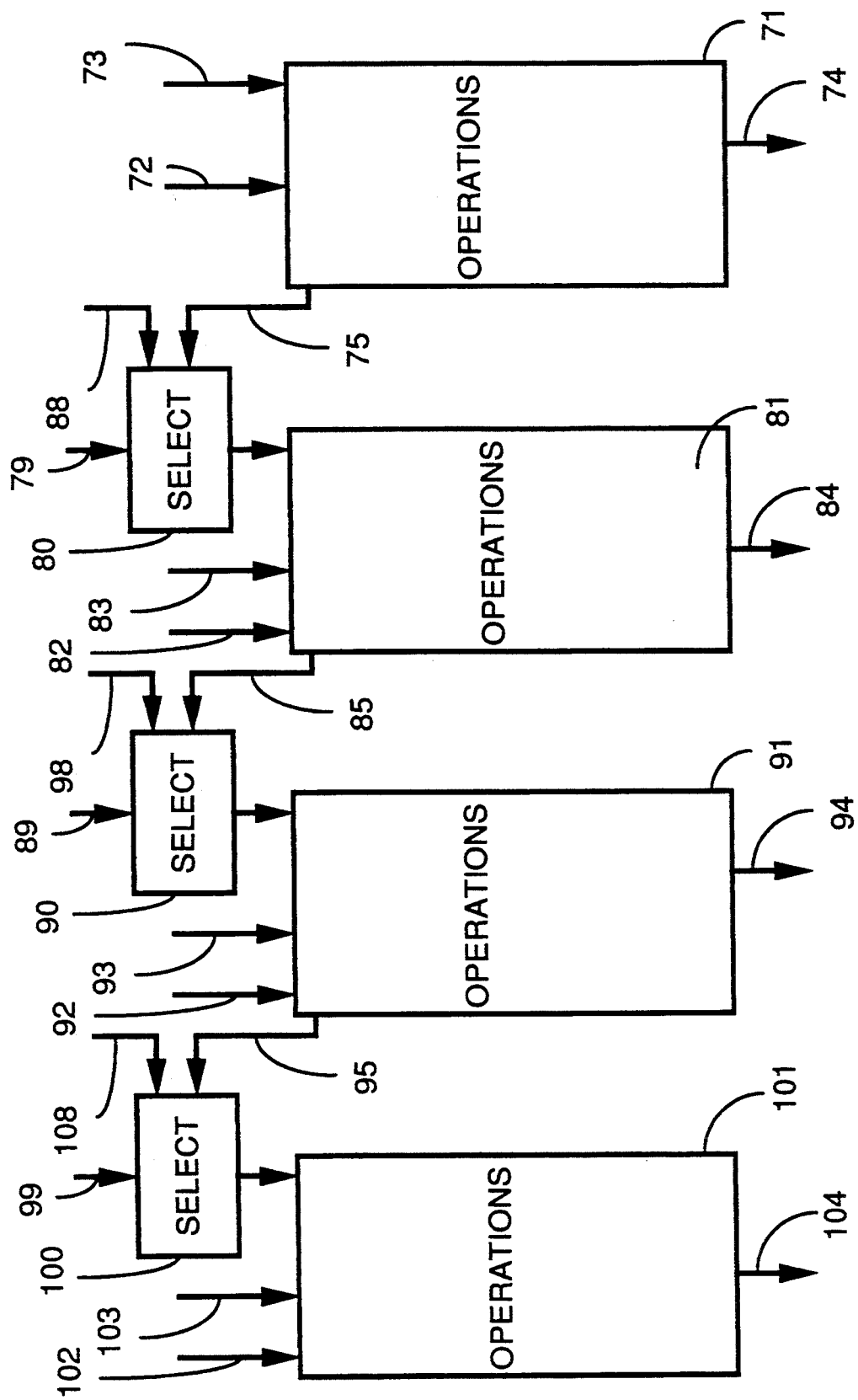
FIG. 9 shows an alternate simplified block diagram of the arithmetic logic unit (ALU) shown in FIG. 2 in accordance with an alternate preferred embodiment of the present invention.

While FIGS. 7 and 8 discuss implementations of ALU 26 with two partitions, an ALU designed in accordance with other preferred embodiments of the present invention may variously partition an ALU. For example, FIG. 9 shows an alternate simplified block diagram of ALU 26 in accordance with an alternate preferred embodiment of the present invention. In FIG. 9, ALU 26 is divided into four partitions. A first partition 71 performs operations on low order bits 72 of a first operand and low order bits 73 of a second operand to produce low order bit results 74. A second partition 81 performs operations on bits 82 of the first operand and bits 83 of the second operand to produce result bits 84. A third partition 91 performs operations on bits 92 of the first operand and bits 93 of the second operand to produce result bits 94. A fourth partition 101 performs operations on high order bits 102 of the first operand and high order bits 103 of the second operand to produce high order bit results 104.

In response to a control input 79, a selector 80 is used to allow information on data path 75 to propagate from first partition 71 to second partition 81 or to intercept information on data path 75 before it is propagated from first partition 71 to second partition 81. Particularly, for arithmetic operations performed on full-word operands or half-word operands, information is allowed to propagate from first partition 71 through selector 80 to second partition 81. For the performance of parallel arithmetic operations on quarter-word operands, selector 80 prevents information from propagating from first partition 71 to second partition 81. Instead the value on a line 88 is forwarded to partition 81. When an "add" is being performed, a logic 0 is placed on line 88. When a "subtract" is being performed, a logic 1 is placed on line 88. Generally, in logic operations, there is no propagation of information between partitions.

In response to a control input 89, a selector 90 is used to allow information on data path 85 to propagate from second partition 81 to third partition 91 or to intercept information on data path 85 before it is propagated from second partition 81 to third partition 91. Particularly, for arithmetic operations performed on full-word operands, information is allowed to propagate from second partition 81 through selector 90 to third partition 91. For the performance of parallel arithmetic operations on quarter-word operands or half-word operands, selector 90 prevents information from propagating from second partition 81 to third partition 91. Instead the value on a line 98 is forwarded to partition 91. When an "add" is being performed, a logic 0 is placed on line 98. When a "subtract" is being performed, a logic 1 is placed on line 98.

In response to a control input 99, a selector 100 is used to allow information on data path 95 to propagate from third partition 91 to fourth partition 101 or to intercept information on data path 95 before it is propagated from third partition 91 to fourth partition 101. Particularly, for arithmetic operations performed on full-word operands and half-word operands, information is allowed to propagate from third partition 91 through selector 100 to fourth partition 101. For the performance of parallel arithmetic operations on quarter-word operands, selector 100 prevents information from propagating from third partition 91 to fourth partition 101. Instead the value on a line 108 is forwarded to partition 101. When an "add" is being performed, a logic 0 is placed on line 108. When a "subtract" is being performed, a logic 1 is placed on line 108.

For example, in a computer which has a sixty-four bit wide data path, each full-word operand is 64 bits. Therefore, when performing operations using 64-bit full word operands, selector 80 allows information to propagate from first partition 71 through selector 80 to second partition 81, selector 90 allows information to propagate from second partition 81 through selector 90 to third partition 91, and selector 100 allows information to propagate from third partition 91 through selector 100 to fourth partition 101. When performing two parallel operations using 32-bit half word operands, selector 80 allows information to propagate from first partition 71 through selector 80 to second partition 81, selector 90 prevents information from propagating from second partition 81 through selector 90 to third partition 91, and selector 100 allows information to propagate from third partition 91 through selector 100 to fourth partition 101. When performing four parallel operations using 16-bit quarter word operands, selector 80 prevents information from propagating from first partition 71 through selector 80 to second partition 81, selector 90 prevents information from propagating from second partition 81 through selector 90 to third partition 91, and selector 100 prevents information from propagating from third partition 91 through selector 100 to fourth partition 101.

Other groupings could be used for parallel processing in accordance with preferred embodiments of the present invention. For example, in a processing system with a sixty-four bit wide data path, the control inputs could be selected so that parallel processing of two sixteen bit and four eight-bit arithmetic operations are all performed simultaneously. Additionally any bit combination which add up to no more than the word size could be used. For example, parallel processing of seventeen bit, three bit, sixteen bit, twelve bit, five bit, and eleven bit arithmetic operations can also be performed simultaneously. The principles discussed above also apply to a carry look-ahead adder.

Figure 10:
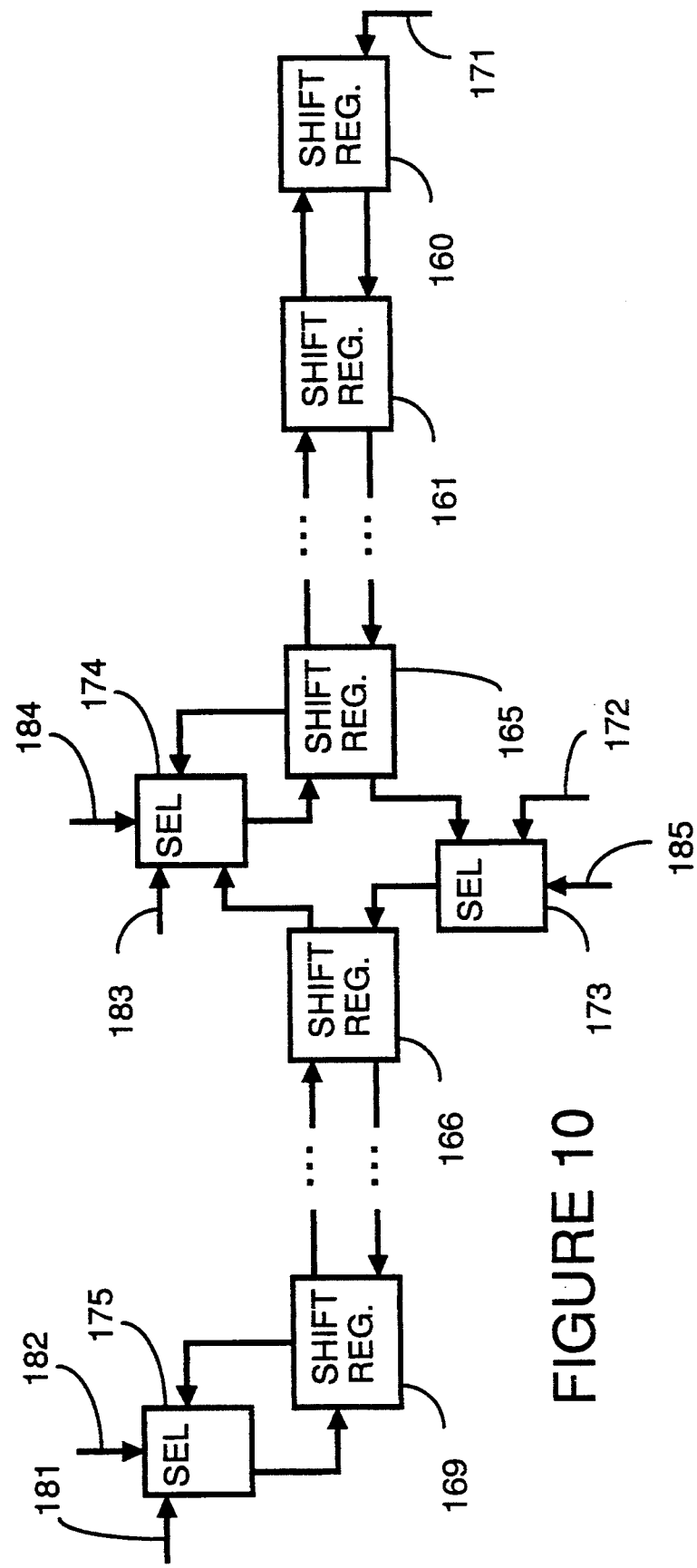
FIG. 10 shows a simplified block diagram of a pre-shifter in accordance with a preferred embodiment of the present invention.

As will be understood by persons of skill in the art, principles of the present invention are not confined to arithmetic operations within computer system ALUs. For example, partitioning as shown in the ALU may also be extended to other entities within the computer system which operate on data. For example, FIG. 10 shows the present invention embodied in pre-shifter 27. The same embodiment of the present invention may also be used to implement shifter 29. Partitioning of pre-shifter 27 and shifter 29 allows, for example, for the implementation of parallel shift-and-add operations and parallel shift operations Pre-shifter 27 (or shifter 29) is shown to include a shift register one-bit slice 160, a shift register one-bit slice 161, a shift register one-bit slice 165, a shift register one-bit slice 166 and a shift register one-bit slice 169.

When data is shifted to the left, a datum on input 171, typically a logic 0 value, is used as input to shift register one-bit slice 160. When data is shifted to the right, a selector 175 in response to a control input 182 selects either a datum on input 181 (a logic 0 value or a logic 1 value) or selects the value currently stored by shift register one-bit slice 169 to be input to shift register one-bit slice 169.

Wherever the shifter is to be partitioned, additional selectors are added to the shifter. For example, FIG. 10 shows the shifter partitioned between shift register one-bit slice 165 and shift register one-bit slice 166. There a selector 174 and a selector 173 have been added. For shift operations on partitioned operands, when data is shifted to the left, selector 173, in response to a control input 185, selects a datum on input 172, typically a logic 0 value, to be used as input to shift register one-bit slice 166. For shift operations on full word operands, when data is shifted to the left, selector 173 selects output from shift register one-bit slice 165 to be used as input to shift register one-bit slice 166.

For shift operations on partitioned operands, when data is shifted to the right, selector 174 in response to a control input 184 selects either a datum on input 183 (a logic 0 value or a logic 1 value) or selects the value currently stored by shift register one-bit slice 166 to be input to shift register one-bit slice 165. For shift operations on full word operands, when data is shifted to the right, selector 174 selects output from shift register one-bit slice 166 to be used as input to shift register one-bit slice 165.

FIG. 10 shows a shifter with only two partitions. As will be understood from the foregoing discussion of partitions in an ALU, the shifter can be partitioned in a variety of ways. For example, a 64-bit shifter may be partitioned into two, four, eight, sixteen, thirty-two or sixty-four bit equal size partitions. Additionally, it is not a requirement of the present invention that partitions each operate on equal number of bits.

While the above embodiment describes the pre-shifter 27 and shifter 29 implemented as a shift register consisting of a series of one bit slices, alternative preferred embodiments are pre-shifters and shifters implemented with multiplexors. Typically, pre-shifter 27 is implemented by a one level of multiplexors, since it can usually shift by at most a small number of bits, for example, 0, 1, 2, 3 or 4 bits. Shifter 29 is typically implemented by three levels of multiplexors, where each level of multiplexor is a four-to-one multiplexor. For example, in a 64-bit shifter 29, the first level of multiplexors will shift either 0, 16, 32 or 48 bits. The second level of multiplexors can shift either 0, 4, 8 or 12 bits. The third level of multiplexors can shift 0, 1, 2 or 3 bits. This gives a shift of any number of bits from 0 to 63. In such a shifter built up of 3 stages of multiplexors, one-bit slices can still be identified. However the blocking of the shifts between any two bits may need to be done in one or more of the three multiplexer stages, as will be understood by those of ordinary skill in the art.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computing system comprising:

first arithmetic operation means for performing a first arithmetic operation on a first n-bit unsigned binary operand and a second n-bit signed binary operand to produce an n-bit unsigned binary result;

first positive overflow means, coupled to the first arithmetic operation means, for assigning a value of $2^n-1$ to the n-bit unsigned binary result when there is a positive overflow; and, first negative overflow means, coupled to the first arithmetic operation means, for assigning a value of 0 to the n-bit unsigned binary result when there is a negative overflow.

2. A computing system as in claim 1 wherein:

the first positive overflow means includes means for assigning a value of $2^n-1$ to the n-bit unsigned binary result when a most significant bit of the first n-bit unsigned binary operand is equal to 1, a most significant bit of the second n-bit signed binary operand is equal to 0 and a most significant bit of the n-bit unsigned binary result is equal to 0; and, the first negative overflow means includes means for assigning a value of 0 to the n-bit unsigned binary result when the most significant bit of the first n-bit unsigned binary operand is equal to 0, the most significant bit of the second n-bit signed binary operand is equal to 1 and the most significant bit of the n-bit unsigned binary result is equal to 1.

3. A computing system as in claim 1 additionally comprising:

second arithmetic operation means for performing a second arithmetic operation on two n-bit signed binary operands to produce an n-bit signed binary result;

second positive overflow means, coupled to the second arithmetic operation means, for assigning a value of $2^{n-1}-1$ to the n-bit signed binary result when there is a positive overflow resulting from the second arithmetic operation; and, second negative overflow means, coupled to the second arithmetic operation means, for assigning a value of $-2^{n-1}$ to the n-bit signed binary result when there is a negative overflow resulting from the second arithmetic operation.

4. A computing system as in claim 3 wherein the computer system implements multiple operations in response to a single instruction so that the second arithmetic operation is one of a plurality of parallel operations performed simultaneously in an arithmetic logic unit.

5. A computing system as in claim 3 wherein:

the first positive overflow means includes means for assigning a value of $2^n-1$ to the n-bit unsigned binary result when a most significant bit of the first n-bit unsigned binary operand is equal to 1, a most significant bit of the second n-bit signed binary operand is equal to 0 and a most significant bit of the n-bit unsigned binary result is equal to 0;

the first negative overflow means includes means for assigning a value of 0 to the n-bit unsigned binary result when the most significant bit of the first n-bit unsigned binary operand is equal to 0, the most significant bit of the second n-bit signed binary operand is equal to 1 and the most significant bit of the n-bit unsigned binary result is equal to 1.

the second positive overflow means includes means for assigning a value of $2^{n-1}-1$ to the n-bit signed binary result when most significant bits for both of the two n-bit signed binary operands are equal to 0, and a most significant bit of the n-bit signed binary result is equal to 1; and, the second negative overflow means includes means for assigning a value of $-2^{n-1}$ to the n-bit signed binary result when the most significant bits for both of the two n-bit signed binary operands are equal to 1, and the most significant bit of the n-bit signed binary result is equal to 0.

6. A computing system as in claim 3 additionally comprising:

third arithmetic operation means for performing a subtraction operation on two n-bit unsigned operands to produce an (n+1)-bit signed binary intermediate result;

third negative overflow means, coupled to the third arithmetic operation means, for providing an n-bit unsigned binary final result by performing a complement operation on the (n+1)-bit signed binary intermediate result when the (n+1)-bit signed binary intermediate result is negative.

7. A computing system as in claim 6 wherein the computer system implements multiple operations in response to a single instruction so that the third arithmetic operation is one of a plurality of parallel operations performed simultaneously in an arithmetic logic unit.

8. A computing system as in claim 3 wherein the second arithmetic operation means comprises an n-bit two's complement adder and wherein the computing system additionally comprises:

selecting means for, in response to a selection, for over-riding operation of the first positive overflow means, the first negative overflow means, the second positive overflow means and the second negative overflow means so that the output of the n-bit two's complement adder is used as an n-bit binary result.

9. A computing system as in claim 8 wherein the computer system implements multiple operations in response to a single instruction so that the first arithmetic operation is one of a plurality of parallel operations performed simultaneously in an arithmetic logic unit.

10. A computing system as in claim 1 wherein the first arithmetic operation means comprises an operation performed by n-bit two's complement adder.

11. A computing system as in claim 10 wherein: the first positive overflow means includes overflow detection logic, the overflow detection logic generating a first positive overflow signal when a most significant bit of the first n-bit unsigned binary operand is equal to 1, a most significant bit of the second n-bit signed binary operand is equal to 0 and a most significant bit of the n-bit unsigned binary result is equal to 0, and saturation logic, coupled to the overflow detection logic and an output of the n-bit two's complement adder, the saturation logic, in response to the first positive overflow signal and in response to a first selection indicating the first arithmetic operation is being performed, replacing output of the n-bit two's complement adder with a value of $2^n - 1$.

12. A computing system as in claim 11 wherein the first negative positive overflow means also includes the overflow detection logic, the overflow detection logic generating a first negative overflow signal when the most significant bit of the first n-bit unsigned binary operand is equal to 0, the most significant bit of the second n-bit signed binary operand is equal to 1 and the most significant bit of the n-bit unsigned binary result is equal to 1, and the saturation logic which, in response to the first negative overflow signal and in response to a first selection indicating the first arithmetic operation is being performed, replacing output of the n-bit two's complement adder with 0.

13. A computing system as in claim 12 additionally comprising:

a pre-shifter, coupled to an input of the n-bit two's complement adder, the pre-shifter in response to a selection, shifting an n-bit binary operand before receipt by the n-bit two's complement adder;

wherein the overflow detection logic additionally detects positive overflow resulting from the pre-shifter shifting the n-bit binary operand to the left before receipt by the n-bit two's complement adder.

14. A computing system as in claim 1 wherein the computer system implements multiple operations in response to a single instruction so that the first arithmetic operation is one of a plurality of parallel operations performed simultaneously in an arithmetic logic unit.

15. A method within a computer implemented by hardware logic components, the method comprising the following steps:

(a) performing, within an arithmetic logic unit, a first arithmetic operation on a first n-bit unsigned binary operand and a second n-bit signed binary operand to produce an n-bit unsigned binary result;

(b) checking to determine whether there is a positive overflow in the n-bit unsigned binary result;

(c) when the check is step (b) determines there is a positive overflow, assigning a value of $2^n - 1$ to the n-bit unsigned binary result;

(d) checking to determine whether there is a negative overflow in the n-bit unsigned binary result; and, (e) when the check is step (d) determines there is a negative overflow, assigning a value of 0 to the n-bit unsigned binary result.

16. A method as in claim 15 wherein:

step (b) includes determining there is a positive overflow when a most significant bit of the first n-bit unsigned binary operand is equal to 1, a most significant bit of the second n-bit signed binary operand is equal to 0 and a most significant bit of the n-bit unsigned binary result is equal to 0; and, step (d) includes determining there is a negative overflow when the most significant bit of the first n-bit unsigned binary operand is equal to 0, the most significant bit of the second n-bit signed binary operand is equal to 1 and the most significant bit of the n-bit unsigned binary result is equal to 1.

17. A method as in claim 15 additionally comprising the steps of:

(f) performing, within the arithmetic logic unit, a second arithmetic operation on two n-bit signed binary operands to produce an n-bit signed binary result;

(g) checking to determine whether there is a positive overflow in the n-bit signed binary result;

(h) when the check is step (g) determines there is a positive overflow, assigning a value of $2^{n-1} - 1$ to the n-bit signed binary result;

(i) checking to determine whether there is a negative overflow in the n-bit signed binary result; and, (j) when the check is step (i) determines there is a negative overflow, assigning a value of $-2^{n-1}$ to the n-bit signed binary result.

18. A method as in claim 17 additionally comprising the step of:

(k) in parallel to step (f) performing an additional arithmetic operation so that the second arithmetic operation is one of a plurality of parallel operations performed simultaneously in an arithmetic logic unit.

19. A method as in claim 17 wherein:

step (b) includes determining there is a positive overflow when a most significant bit of the first n-bit unsigned binary operand is equal to 1, a most significant bit of the second n-bit signed binary operand is equal to 0 and a most significant bit of the n-bit unsigned binary result is equal to 0;

step (d) includes determining there is a negative overflow when the most significant bit of the first n-bit unsigned binary operand is equal to 0, the most significant bit of the second n-bit signed binary operand is equal to 1 and the most significant bit of the n-bit unsigned binary result is equal to 1.

step (g) includes determining there is a positive overflow when most significant bits for both of the two n-bit signed binary operands are equal to 0, and a most significant bit of the n-bit signed binary result is equal to 1; and, step (i) includes determining there is a negative overflow when the most significant bits for both of the two n-bit signed binary operands are equal to 1, and the most significant bit of the n-bit signed binary result is equal to 0.

20. A method as in claim 17 additionally comprising the steps of:

(k) performing, within the arithmetic logic unit, a subtraction operation on two n-bit unsigned operands to produce an (n+1)-bit signed binary intermediate result;

(l) checking to determine whether the (n+1)-bit signed binary intermediate result is negative; and, (m) when the check in step (l) determines the (n+1)-bit signed binary intermediate result is negative, performing a complement operation on the (n+1)-bit signed binary intermediate result to produce an n-bit unsigned binary final result.

21. A method as in claim 20 additionally comprising the step of:

(n) in parallel to step (k) performing an additional arithmetic operation so that the subtraction operation is one of a plurality of parallel operations performed simultaneously in an arithmetic logic unit.

22. A method as in claim 17, additionally comprising the steps of:

(f) performing, within the arithmetic logic unit, a third arithmetic operation on two n-bit binary operands using an n-bit two's complement adder to produce an n-bit binary result wherein no overflow operation is performed on the n-bit binary result.

23. A method as in claim 15 wherein in step (a) the first arithmetic operation is an operation performed by an n-bit two's complement adder.

24. A method as in claim 23 additionally comprising the step of:

(f) shifting an n-bit binary operand before performance of step (a);

wherein step (b) includes checking to determine whether positive overflow results from the performance of step (f).

25. A method as in claim 15 additionally comprising the step of:

(f) in parallel to step (a) performing an additional arithmetic operation so that the first arithmetic operation is one of a plurality of parallel operations performed simultaneously in an arithmetic logic unit.

26. A computing system comprising:

arithmetic operation means for performing a first arithmetic operation on a first n-bit signed binary operand and a second n-bit signed binary operand to produce an n-bit positive signed binary result;

positive overflow means, coupled to the arithmetic operation means, for assigning a value of $2^{n-1}-1$ to the n-bit positive signed binary result when a most significant bit of the first n-bit signed binary operand is equal to 0, a most significant bit of the second n-bit signed binary operand is equal to 0 and a most significant bit of the n-bit positive signed binary result is equal to 1; and, negative overflow means, coupled to the arithmetic operation means, for assigning a value of 0 to the n-bit positive signed binary result when the most significant bit of the n-bit positive signed binary result is equal to 1 and one of either the most significant bit of the first n-bit signed binary operand or the most significant bit of the second n-bit signed binary operand is equal to 1 and for assigning a value of 0 to the n-bit positive signed binary result when the most significant bit of both the most significant bit of the first n-bit signed binary operand and the most significant bit of the second n-bit signed binary operand are equal to 1.

27. A method within a computer implemented by hardware logic components, the method comprising the following steps:

(a) performing, within an arithmetic logic unit, a first arithmetic operation on a first n-bit signed binary operand and a second n-bit signed binary operand to produce an n-bit positive signed binary result;

(b) determining whether a most significant bit of the first n-bit signed binary operand is equal to 0, a most significant bit of the second n-bit signed binary operand is equal to 0 and a most significant bit of the n-bit positive signed binary result is equal to 1 indicating there is a positive overflow in the n-bit positive signed binary result;

(c) when the check is step (b) indicates there is a positive overflow, assigning a value of $2^{n-1}-1$ to the n-bit positive signed binary result;

(d) determining there is a negative overflow in the n-bit positive signed binary result when the most significant bit of the n-bit positive signed binary result is equal to 1 and one of either the most significant bit of the first n-bit signed binary operand or the most significant bit of the second n-bit signed binary operand is equal to 1 and determining there is a negative overflow when both the most significant bit of the first n-bit signed binary operand and the most significant bit of the second n-bit signed binary operand are equal to 1; and, (e) when the check is step (d) determines there is a negative overflow, assigning a value of 0 to the n-bit positive signed binary result.

* * * * *